United States Patent

Lindsay et al.

[15] 3,675,052

[45] July 4, 1972

[54] FIELD-DELINEATED ACOUSTIC WAVE DEVICE

[72] Inventors: George F. Lindsay, Los Angeles; Harper John Whitehouse, Hacienda Heights, both of Calif.

[73] Assignee: The United States of America as represented by the Secretary of the Navy

[22] Filed: Aug. 7, 1970

[21] Appl. No.: 62,117

[52] U.S. Cl. .....................310/8.1, 310/9.8, 333/30
[51] Int. Cl. .....................H01v 7/00
[58] Field of Search.....................340/3 A, 10; 310/8.1, 9.7, 310/9.8; 333/30, 72

[56] References Cited

UNITED STATES PATENTS

| | | | |
|---|---|---|---|
| 3,600,710 | 8/1971 | Adler et al. | 310/9.7 X |
| 3,551,837 | 12/1970 | Speiser et al. | 310/9.8 X |
| 3,573,673 | 4/1971 | De Vries et al. | 333/30 X |
| 3,376,572 | 4/1968 | Mayo | 310/9.8 X |

*Primary Examiner*—J. V. Truhe
*Assistant Examiner*—B. A. Reynolds
*Attorney*—Richard S. Sciascia, Ervin F. Johnston and John Stan

[57] ABSTRACT

An acoustic wave device, wherein an applied electrical signal is transduced to an acoustic wave, comprising: a substrate capable of propagating the acoustic wave; a conductive structure disposed upon the substrate, including at least three separate conductive paths; a pair of the conductive paths including spaced-apart electrodes; and the third conductive path including field-delineating electrodes which are disposed between the electrodes of the pair of paths. In more detail, each of the conductive paths of the acoustic wave device include electrodes in the form of parallel elements, linear or planar, disposed upon the substrate perpendicularly to the direction of surface wave propagation, caused by the application of an electrical voltage to the pair of conductive paths, which is transduced to an acoustic surface wave. The electrodes of each conductive path are spaced a distance *nd* apart, where *n* is an integer, *n* being equal to 1 for the spacing of the shielding electrodes. A bus at one end of the elements connects the set of elements of each respective conductive path.

10 Claims, 4 Drawing Figures

FIG. 4.

INVENTORS.
GEORGE F. LINDSAY
HARPER JOHN WHITEHOUSE
*BY* ERVIN F. JOHNSTON
ATTORNEY.
JOHN STAN, AGENT.

FIELD-DELINEATED ACOUSTIC WAVE DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an acoustic wave device of two types: one wherein a surface wave propagates along the surface of a substrate, and the other wherein an acoustic bulk or volume wave propagates through the material.

The invention is more easily understood in terms of surface waves, and most of the description involves an acoustic surface wave device upon which are disposed, for example, by electro- or vacuum-deposition, linear elements, which serve as electrodes, connected by a bus bar at one end, first described by White and Voltmer in the article entitled "Direct Piezoelectric Coupling to Surface Elastic Waves," which appeared in Volume 7, Number 12, of "Applied Physics Letters," dated Dec. 15, 1965.

The electrodes are interdigitated, either uniformly as described in the original paper, or non-uniformly, that is, in a coded manner. When interdigitated uniformly, only two sets of elements are required, each with a common bus bar. Each set of elements serves to shield the other set when an electromotive force is applied across the bus bars, and therefore provide adequate directivity of the generated surface wave.

Current surface wave devices having two sets of electrodes define their electric field properly only for uncoded interdigitated configurations. When coded, regions of equipotential exist at the phase transition regions and unterminated fields exist at the ends of the transducers. A phase transition region is a region where the phase shifts 180°.

SUMMARY OF THE INVENTION

A key feature of this invention is the introduction of a third set of elements, or electrodes, interposed between, but not in contact with, the two sets of elements of the prior art, which may be termed a field-delineating set of electrodes, since it provides for acoustic delineation of the acoustic radiation of the surface wave device. The field-delineating structure terminates the electric field lines from the busses of the other two sets of elements. The delineated electric fields cause mechanical deformation of the substrate when they are present, thus causing acoustic surface wave propagation when the substrate is not absorbing. The advantage of the introduction of the field-delineating set of electrodes is that a field is always present irrespective of the electrode coding of the original two sets of electrodes, and that this field is delineated to a prescribed region of the acoustic wave device, and does not interact with the other two sets of electrodes. This improves signal generation in multi-element applications and reduces cross talk between adjacent sets of elements.

STATEMENT OF THE OBJECTS OF INVENTION

An object of the present invention is the provision of an acoustic wave device using interdigitated electrodes which has improved directivity of acoustic wave propagation over prior art devices.

Another object is to provide an acoustic wave device with minimal crosstalk between the sets of electrodes.

Other objects and advantages and novel features of the invention will become apparent from the following detailed description of the invention, when considered in conjunction with the accompanying drawings.

DESCRIPTION OF THE PREFERRED EMBODIMENTS

Figures 1, 4:
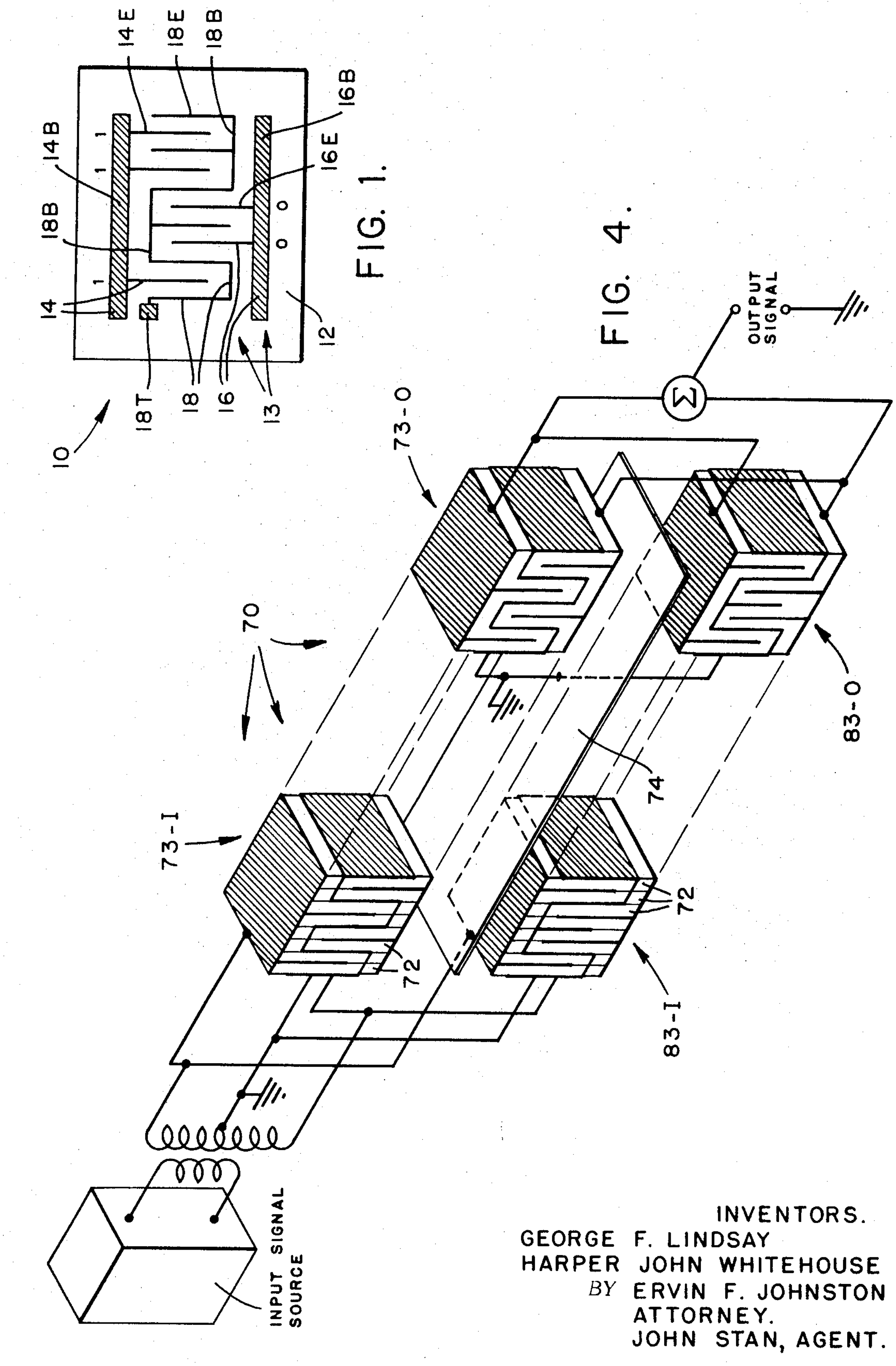
FIG. 1 is a plan view of a simple acoustic surface wave device of this invention, with three separate conductive paths, one path including the field-delineating set of electrodes interposed between the other two paths of the prior art.
FIG. 4 shows a volume wave device similar in configuration to the surface wave device shown in FIG. 3.

Referring now to FIG. 1, there is shown an acoustic surface wave device 10 comprising a substrate 12, capable of propagating an acoustic wave and a conductive structure 13 disposed upon the substrate, including at least three separate conductive paths, 14, 16 and 18.

The substrate 12 may be a piezoelectric material, for example quartz, or a ferroelectric material.

The conductive structure 13 may comprise a metal, such as aluminum or silver, electro- or vacuum-deposited upon the substrate 12.

A pair of the conductive paths, 14 and 16, include spaced-apart electrodes 14E and 16E. The third conductive path 18 includes field-delineating electrodes 18E which are disposed between the electrodes 14E and 16E of the pair of conductive paths 14 and 16. The field-delineating electrodes 18E are so called because they delineate the shape of the electric field between the other two sets of electrodes, 14E and 16E.

Generally, the conductive paths 14, 16 and 18 include electrodes 14E, 16E and 18E in the form of a set of parallel, linear, elements, disposed upon the substrate 12 perpendicularly to the direction of surface wave propagation, which is in a horizontal direction in FIG. 1. The electrodes 14E, 16E and 18E of each conductive path 14, 16 and 18 are spaced a distance $nd$ apart, where $n$ is an integer, $n$ being equal to 1 for the spacing of the field-delineating electrodes 18E. A bus 14B, 16B or 18B at one end of the set of electrodes 14E, 16E or 18E, connects the set of electrodes of each respective conductive path, 14, 16 or 18. The metalization bus tab 18T facilitates connecting the field-delineating conductive path 18 to external circuitry.

Generally, the electrodes 14E, 16E and 18E of all three conductive paths 14, 16 and 18 are not spaced a uniform distance $d$ apart, but rather, the electrodes are interdigitated in a coded manner. The coding shown in FIG. 1 is 10011.

Figure 2:
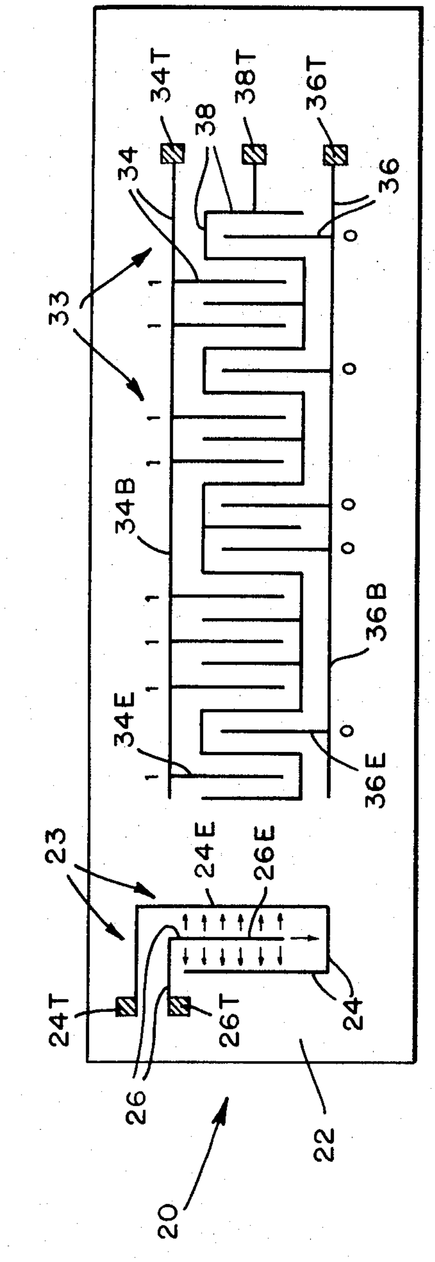
FIG. 2 is a plan view showing two conductive structures mounted on a single substrate.

FIG. 2 shows an embodiment 20 including a substrate 22 upon which are mounted two conductive structures, an input conductive structure 23 to the left of the substrate and an output conductive structure 33 at the right. The input conductive structure 23 disposed upon the substrate 22 is adapted to generate an acoustic wave across the substrate, again in a horizontal direction.

It will be observed that the input conductive structure 23 comprises only a pair of conductive paths 24 and 26, each comprising one element or electrode, 24E and 26E, the electrode 24E shielding electrode 26E. Input metalization tabs 24T and 26T, again, facilitate connection or bonding to external circuitry. The arrows shown between electrodes 26E and 24E indicate the direction of the electric field between these electrodes.

The output conductive structure 33 has three conductive paths 34, 36 and 38, as in the conductive structure 13 shown in FIG. 1. Its coding is 1011100110110. As an alternative to the bus bar construction shown in FIG. 1, the busses 34B and 36B in this figure are of the same thickness as the linear elements or electrodes 34E and 36E. Output metalization tabs 34T, 36T and 38T connect the three-path electrode structure 33 to output circuitry, not shown.

Figure 3:
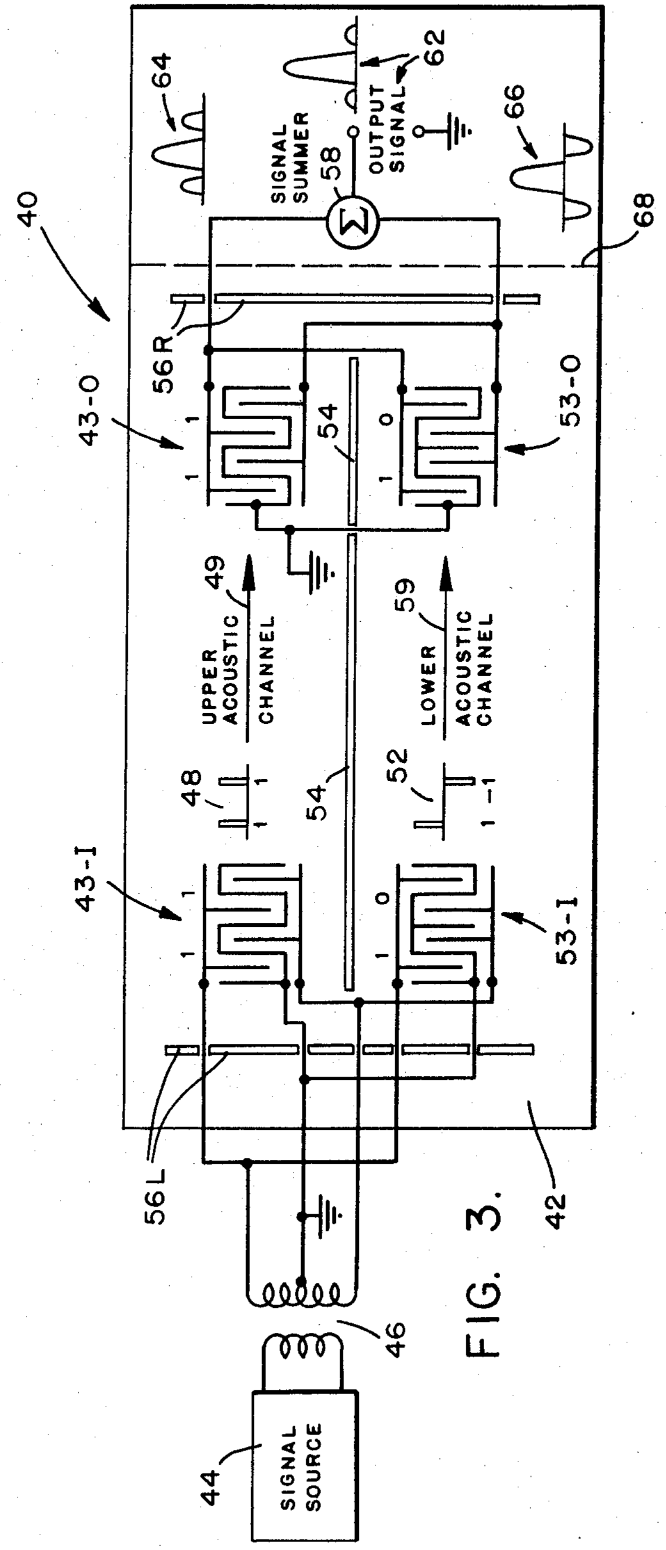
FIG. 3 shows a surface wave device in the form of a pair of input-output structures configured to correspond to both members of a Golay complementary pair.

FIG. 3 shows an embodiment of an acoustic surface wave device 40, wherein the upper input and output conductive structures 43–I and 43–O are identical, as are the lower input and output conductive structures, 43–I and 43–O, and correspond in configuration to both members of a Golay complementary pair.

Before discussing the embodiment shown in FIG. 3 in more detail, a few remarks about Golay complementary series should prove helpful.

A Golay complementary series may be defined as a pair of equally long, finite, sequences of two kinds of elements, for example the binary numbers, the 0 and the 1, which have the property that the number of pairs of like elements with any given separation in one series is equal to the number of pairs of unlike elements with the same separation in the other series.

For instance, the two series, 1001010001 and 1000000110 have, respectively, three pairs of like and three pairs of unlike adjacent elements, four pairs of like and four pairs of unlike alternate elements, and so forth for all possible separations.

These series have possible applications in communication engineering, for when the two kinds of elements of these series are taken to be +1 and −1, it follows immediately from their definition that the sum of their two respective auto-correlation series is zero everywhere, except for the center term.

Referring now back to FIG. 3, therein is shown a schematic diagram of an embodiment of an acoustic surface wave device 40, comprising a crystal substrate 42, upon which is disposed an upper and lower pair of conductive structures. The upper structure pair comprises an upper input conductive structure 43–I and an upper output conductive structure 43–O, while the lower structure pair comprises a lower input conductive structure 53–I and a lower output conductive structure 53–O. Application of a signal to the input conductive structures 43–I and 53–I, for example, generated by a signal source 44, across transformer 46, causes acoustic surface wave propagation, in upper and lower acoustic propagation channels 49 and 59 respectively, upon the surface of the substrate 42. The secondary of transformer 46 is shown grounded, while the primary is not, altho it also may be.

When a single pulse is generated by the signal source 44, acoustic signals which may be represented by the wave forms shown by reference numerals 48 and 52 are generated by the input Golay complementary pair of conductive structures, 43–I and 53–I, respectively, with the right-hand pulses, for example, the −1 pulse of pulse train 52, being transmitted first in time. Signal source 44 may generate either discrete signals or continuous signals.

Each conductive structure of the other Golay pair of structures serves as an output conductive structure 43–O and 53–O. It is to be noted that the input and output conductive structures are aligned in the direction 49 or 59 of acoustic wave propagation; and that each input conductive structure 43–I or 53–I is interdigitated identically to the output conductive structure 43–O or 53–O, respectively, that it is aligned with.

It will be noted that the coding shown in FIG. 3 involves twice as many unshielded electrode elements per bit as does the coding shown in FIG. 1, which requires only one unshielded electrode element per bit, whether a 1 or 0. Considering only the unshielded electrode elements of FIG. 3, as may be seen most clearly in transducer 53–I, or 53–O, the sequence of unshielded electrode elements wherein the left element of a pair of electrodes is connected to a top bus bar and the right element of the same pair is connected to the bottom bus bar designates a 1, while the reverse sequence of a pair of electrode elements designates a 0. Effectively, the overall coding, 11 for the upper transducers 43–I and 43–O and 10 for the bottom transducers 53–I and 53–O, contains a subcoding which defines a bit by the specific sequencing of the two electrode elements forming the bit. In a more complex subcoding, the specific sequencing of three or more elements may determine whether the bit be a 1 or a 0.

The crystal substrate 42 generally consists of a piezoelectric crystal, for example, quartz. However, the substrate 42 may be a non-piezoelectric insulator, upon which are deposited the conductive structures and over which a piezoelectric material is deposited. An isolator divider strip 54 is positioned between the upper and lower pair of conductive structures, to prevent unwanted cross-coupling between signals in the upper and lower acoustic signal channels 49 and 59. An absorber stripe 56L and 56R at each end of a Golay complementary pair prevents unwanted back reflections from occurring.

The reason that two identical conductive structures are used in upper acoustic channel 49 and lower acoustic channel 59, is that under these conditions the output signal traversing two identical conductive structures is then equal to the convolution of the input signal with the autocorrelation function of the input conductive structure or the output conductive structure. That is, the impulse response is the autocorrelation function of the conductive structure coding. Advantage is taken here of the fact that the autocorrelation functions of the two members of the Golay complementary pair have equal and opposite side lobes. Along one acoustic path, the upper signal transmission channel 49, a first autocorrelation function is generated, whereas along the second signal transmission channel, lower acoustic channel 59, a second autocorrelation function is generated which is the complement of the first autocorrelation function.

It will be noted that the inputs from signal source 44 to the input electrodes of the upper and lower input conductive structures 43–I and 53–I are connected together, as are corresponding output electrodes of the upper and lower output conductive structures 43–O and 53–O, with two of them being connected to a signal summer 58 to provide an output signal 62, as shown.

The binary designation of a Golay complementary pair is usually the conventional binary designation, a 1 and an 0, as shown above each of the conductive structures in FIG. 3. However, to supply a clearer picture of the manner in which the various pulses coact with each other, they are pictured as positive and negative pulses, as shown by reference numerals 48 and 52. Also, if the mathematical operation of autocorrelation is performed, a more nearly correct answer is obtained if the two unlike elements be considered as a +1 and a −1. The autocorrelation of the sequence 1, 1 gives the sequence 1, 2, 1 as a result, which is shown diagrammatically by reference numeral 64. The autocorrelation of the complementary Golay sequence 1, −1 after operation by the autocorrelation function results in the sequence −1, 2, −1, and is shown by reference numeral 66. The two wave forms 64 and 66 are added together in the signal summer 58 to result in an output signal 62 having substantially no side lobes.

In FIG. 3, the dashed line 68 is meant to designate that everything to its right, specifically the signal summer 58, need not be disposed on the substrate 42 itself, but may be mounted on a separate, insulating, unit.

FIG. 4 is a simplified sketch of a volume-type or bulk-type acoustic wave device 70 patterned after a Golay complementary series. A comparison of FIG. 4 with FIG. 3 will show the essential difference in construction between a surface wave device 40 and a volume wave device 70. The individual crystal plates 72 are all part of a single crystal substrate which has been cut into individual segments, and then reassembled to form the two pairs of volume wave devices 73–I and 83–I and 73–O and 83–O wherein the electrodes are configured to correspond to a Golay complementary pair. Metal is then deposited on the appropriate surfaces as shown in this figure, and the plates are then pressed together in the same crystal alignment with respect to the crystal axes as before the crystal substrate had been cut into the individual sections 72.

The material, shown by dashed lines between the input and output volume wave devices, for example between upper input volume wave device 73–I and upper output volume wave device 73–O, could be any acoustic propagating material such as a crystal or even water.

Not shown are various supports holding all components in proper juxtaposition to each other.

One component needing support would be isolator sheet 74, which could include a sound-absorbing material, such as an elastomeric material. To clarify FIG. 4, particularly the connections to input and output volume wave devices, 73–I and 83–I, and 73–O and 83–O, respectively, flat absorber sheets, analogous to the linear absorber stripes 56L and 56R shown in FIG. 3, are not shown, but would, generally, be required.

It will be noted that, if a section be taken through the crystal plates 72 in a direction perpendicular to the flat surfaces of the deposited metal forming the planar electrodes and busses, and consequently parallel to the front surface of the acoustic volume wave device 80, the profile will resemble the acoustic surface wave device shown in FIG. 3. It must be realized that the deposited metal forming the electrodes and busses is of extremely small thickness, and in an actual sample cannot be readily distinguished from a line of separation wherein no deposited metal appears. Consequently, the metal serving as electrode and bus material is shown greatly exaggerated in thickness, in FIG. 4, for clarity of illustration.

Obviously many modifications and variations of the present invention are possible in the light of the above teachings. It is therefore to be understood that within the scope of the appended claims the invention may be practiced otherwise than as specifically described.

What is claimed is:

1. An acoustic wave device comprising:

a substrate capable of propagating an acoustic wave;

a conductive structure disposed upon the substrate, including at least three separate conductive paths;

a pair of the conductive paths including spaced-apart, interdigitated, electrodes; and the third conductive path including field-delineating electrodes which are interdigitated between the electrodes of the pair of paths;

the conductive paths including:

electrodes in the form of a set of parallel elements disposed upon the substrate substantially overlapping in a direction perpendicularly to the direction of surface wave propagation;

the electrodes of each conductive path being spaced a distance *nd* apart, where *n* is an integer, *n* being equal to 1 for the spacing of the field-delineating electrodes; and a bus at one end of and connecting the set of elements of each respective conductive path.

2. An acoustic wave device according to claim 1, wherein the electrodes of each of the three conductive paths are spaced a uniform distance *d* apart.

3. An acoustic wave device according to claim 1, wherein not all of the electrodes of each of the pair of conductive paths are spaced a unit distance *d* apart, that is, the electrodes are interdigitated in a coded manner.

4. An acoustic wave device according to claim 3, wherein the conductive structure constitutes an output conductive structure; and further comprising:

an input conductive structure disposed upon the substrate, adapted to transduce an electrical signal applied to it into an acoustic wave which propagates across the substrate.

5. An acoustic wave device according to claim 4, wherein the input conductive structure comprises a pair of conductive paths.

6. An acoustic wave device according to claim 5, wherein the pair of conductive paths for the input conductive structure comprise one element, or electrode, for each path.

7. An acoustic wave device according to claim 4, wherein the input and output conductive structures are identical, and correspond in configuration to one member of a Golay complementary pair; and further comprising another input and output conductive structure, disposed upon the substrate parallel to the first-named input and output conductive structures, respectively, and configured to correspond to the second member of a Golay complementary pair.

8. An acoustic wave device according to claim 7, further comprising an isolator strip disposed between the members of the Golay complementary pair; and an absorber stripe at each end of the substrate, disposed parallel to the electrodes.

9. An acoustic wave device according to claim 8, wherein the acoustic wave device is a surface wave device, wherein the substrate is a flat plate, capable of propagating a surface wave;

the electrodes are flat, parallel, linear elements disposed upon the surface of the substrate;

the busses are linear and disposed upon the surface of the substrate; and the isolator strip and absorber stripes are flat, linear, and disposed upon the surface of the substrate.

10. An acoustic wave device according to claim 8, wherein the acoustic wave device is a volume wave device, wherein the substrate consists of right, rectangular, prismatic, segments, capable of propagating a volume wave;

the electrodes are rectangular, planar, parallel, surfaces disposed upon the surfaces of the segments of the substrate;

the busses are planar and disposed upon the surfaces of the segments of the substrate; and the isolator strip and absorber stripes are rectangular, planar, surfaces disposed upon the surfaces of the segments of the substrate.

* * * * *